United States Patent [19]
Cichowski

[11] 3,926,845
[45] Dec. 16, 1975

[54] CATALYSTS COMPOSITIONS

[75] Inventor: Robert S. Cichowski, San Luis Obispo, Calif.

[73] Assignee: Phillips Petroleum Company, Bartlesville, Okla.

[22] Filed: Feb. 7, 1974

[21] Appl. No.: 440,483

Related U.S. Application Data

[62] Division of Ser. No. 215,147, Jan. 3, 1972, Pat. No. 3,810,953.

[52] U.S. Cl. ............... 252/432; 252/435; 252/437; 260/680 E; 260/683.3
[51] Int. Cl.² .................... B01J 21/02; B01J 27/18
[58] Field of Search ...... 260/680 E, 683.3; 252/432, 252/435, 437

[56] References Cited
UNITED STATES PATENTS

| | | | |
|---|---|---|---|
| 3,205,181 | 9/1965 | Bowman et al. | 252/437 |
| 3,232,888 | 2/1966 | Adam | 252/432 X |
| 3,308,188 | 3/1967 | Bajars | 260/683.3 X |
| 3,399,246 | 8/1968 | Traynor et al. | 252/437 X |
| 3,513,216 | 5/1970 | Woskow | 252/432 X |
| 3,555,105 | 1/1971 | Nolan et al. | 252/435 X |
| 3,627,672 | 12/1971 | Kittrell et al. | 252/437 X |
| 3,661,804 | 5/1972 | Scholz et al. | 252/437 X |
| 3,793,225 | 2/1974 | Bertus et al. | 252/437 |
| 3,801,670 | 4/1974 | Shiraishi et al. | 252/437 X |
| 3,828,101 | 8/1974 | Miklas | 252/437 X |

*Primary Examiner*—Patrick P. Garvin

[57] ABSTRACT

Organic compounds are oxidatively dehydrogenated in the presence of a solid catalyst comprising cobalt, phosphorus, combined oxygen and at least one metal from the group indium, magnesium, aluminum, thorium, yttrium, cadmium, lead, beryllium, zinc, manganese, silver, cerium, zirconium, boron and calcium.

8 Claims, No Drawings

CATALYSTS COMPOSITIONS

This is a division of application Ser. No. 215,147, filed Jan. 3, 1972, now U.S. Pat. No. 3,810,953.

The present invention relates to chemical compositions and chemical conversion processes. More particularly, the invention relates to catalyst compositions, their preparation, and to catalytic processes for the conversion of organic compounds employing such compositions, e.g., processes for effecting the dehydrogenation of hydrocarbons.

It is a continuing goal of the chemical processing industries to find both primary and alternative methods for converting raw materials which are readily available into other materials which may be less plentiful and more valuable. Quite often, alternative methods are sought because they can sometimes, depending on the specific circumstances, provide conveniences and economies that can make the difference whether a specific chemical processing scheme is practical or not.

One of the more useful of such conversion methods is dehydrogenation processes for the conversion of organic compounds such as hydrocarbon feedstocks to unsaturated compounds or compounds having a higher degree of unsaturation. A number of catalytic processes have been developed which have attained some measure of commercial success. Such processes generally are characterized by the particular catalytic material employed and the conditions under which the processes are operated, e.g., in the absence or presence of oxygen. None of the presently known processes represent a panacea for the problems encountered in such conversions. As a consequence, there is a continuing search to develop catalytic materials and processes which are more efficient in minimizing side reactions, improving conversion rates, improving yields and selectivities to desired end product, or which have a low susceptibility to deactivation, i.e., are capable of extended periods of operation without regeneration, and/or which can be readily regenerated to an activity approaching that of fresh catalysts.

A number of catalysts and catalyst systems which include halogens or halogen-releasing compounds have been disclosed. These, however, exhibit many disadvantages in regard to equipment corrosion and expense of continuously feeding, recovering and recycling the relatively expensive halogen materials. Halogen-free catalysts remain the most desirable for use in dehydrogenation processes since they are not plagued by the problems introduced through the use of the halogen-containing catalysts.

The present invention provides a novel catalyst and a novel process for the conversion of hydrocarbon feedstocks to hydrocarbons having a greater degree of unsaturation and which have the same or lower number of carbon atoms as in the hydrocarbon feed. According to this invention, dehydrogenatable organic compounds having at least one

grouping, particularly paraffinic and monoolefinic hydrocarbons, are oxidatively dehydrogenated to unsaturated products or products having a greater degree of unsaturation by contacting such compounds under dehydrogenation conditions in the vapor phase in the presence of molecular oxygen with a catalytic material comprising cobalt, phosphorus and combined oxygen in combination with at least one metal selected from the group consisting of indium, magnesium, aluminum, thorium, yttrium, cadmium, lead, beryllium, zinc, manganese, silver, cerium, zirconium, boron or calcium. Thus, paraffinic hydrocarbons can be converted in good yields to diolefins and/or monoolefins, and monoolefins can be converted to diolefins. The invention is particularly suitable for the conversion of butane to butenes and butadiene, isopentane to isoamylenes and isoprene, and butenes to butadienes.

In accordance with this invention, an organic feedstock can be converted directly to unsaturated products or products having a greater degree of unsaturation by contacting said feedstock under dehydrogenation conditions in the vapor phase in the presence of molecular oxygen with a calcined catalytic composite comprising cobalt and phosphorus in association with at least one metal selected from the group consisting of indium, magnesium, aluminum, thorium, yttrium, cadmium, lead, beryllium, zinc, manganese, silver, cerium, zirconium, boron and calcium, together with sufficient combined oxygen to satisfy the valence requirements of the metals. Thus, paraffinic hydrocarbons can be converted in significant yields to diolefins and/or monoolefins, and monoolefins can be converted to diolefins.

The feedstocks which are applicable for the oxidative dehydrogenation processes of the present invention comprise dehydrogenatable organic compounds having from about 2 to about 12 carbon atoms per molecule and at least one

grouping, i.e., adjacent carbon atoms each having at least one hydrogen atom. Hydrocarbons have been found to be particularly useful feedstocks. Particularly applicable are acyclic paraffins and monoolefins, preferentially such materials having from 4 to 12 carbon atoms. These can be branched or unbranched. The conversion of butane to butenes and butadiene, the conversion of isopentane to isoamylenes and isoprene, and the conversion of butenes to butadiene are presently considered most advantageous with the processes and catalysts of the present invention. Some specific examples of other feeds include ethane, propane, isobutane, pentane, hexane, 2-methylhexane, octane, dodecane, 2,4-dimethyloctane, 2-methylbutene-1, hexene-2, octene-1, 3-methylnonene-4, dodecene-1, and the like, including mixtures thereof.

The novel catalysts of the present invention can be represented by the formula $Me_xCoP_yO_z$. As is evidenced by the formula, the catalysts of the present invention comprise calcined mixtures of cobalt, phosphorus, and a promoting metal in association with combined oxygen. These are present in atomic ratios as indicated by the $Me_xCoP_yO_z$ formula. In the formula, Me represents a metal selected from the group consisting of indium, magnesium, aluminum, thorium, yttrium, cadmium, lead, beryllium, zinc, manganese, silver, cerium, zirconium, boron or calcium; $x$ is a number in the range of about 0.01 to about 5, preferably about 0.1 to about 1 except that, when Me is magnesium, the value of $x$ is in the range of about 0.1 to 0.14; $y$ is a number in the range of about 0.01 to about 5, preferably 0.1 to about 0.5; and $z$ is a number determined by the valence requirements of the calcined Me, Co, and P mixture. The elements contained in the catalysts are not necessarily in the elemental state but can be combined with sufficient oxygen to form one or more neutral compounds such as cobalt oxide, cobalt phosphate, phosphorus oxides, other metal oxides and phosphites, and the like, depending upon the identity and proportions of the elements present.

These catalysts can also be supported on, or diluted with, a conventional catalytic material such as silica, alumina, boria, magnesia, titania, zirconia, and the like, and combinations thereof, as well as with other similar conventional catalyst support materials known in the art.

The catalysts of the present invention can be prepared by any suitable method. Conventional methods such as coprecipitation, impregnation, or dry-mixing can be used. In general, any method can be used which will provide a composition containing the above-described elements in the above-described atomic proportions and preferably having a catalytic surface area of at least one square meter per gram. Thus, a cobalt compound, a phosphorus, compound, and a compound of a suitable promoter metal can be combined in any suitable way. Substantially any cobalt, phosphorus, or promoting metal compound can be employed in the preparation of these catalysts so long as none of the compounds are detrimental to the final oxidative dehydrogenation catalyst, and essentially all of the elements in the compounds used, other than the cobalt, phosphorus, promoting metal, or oxygen, are removed from the final catalyst by prior washing or by volatilization such as during calcination. However, small amounts of some other elements involved in the preparation of the catalyst can be tolerated in the final catalytic composition. For example, if alkali metal or alkaline earth metal hydroxides are used in the procedure involving precipitation of cobalt or of the promoting metal, small residual amounts of such alkali or alkaline earth metals are not damaging to the final catalyst composition. Similarly, if cobalt sulfate or a promoting metal sulfate is employed in the preparation, small residual amounts of sulfur can also be tolerated. Halogen residues, on the other hand, are considered undesirable and these should be minimized.

Generally, however, the preferred cobalt, phosphorus, and promoting metal compounds are either the oxides of these elements or compounds which are convertible to the oxide on calcination. Some examples of these are cobalt nitrate, cobalt acetate, phosphoric acid, indium iodide, magnesium formate, aluminum isopropoxide, thorium nitrate, yttrium oxide, cadmium acetate, lead nitrate, beryllium chloride, zinc phosphate, magnesium ammonium sulfate, silver nitrate, cerium acetate, zirconium nitrate, ammonium borate, calcium nitrate, and the like, including mixtures thereof.

A preferred catalyst preparation method is to boil the solution containing soluble compounds of cobalt, phosphorus and a promoting metal until sufficient water has been removed and the mixture is a viscous, hot, syrupy liquid which would solidify on cooling. This largely dehydrated mixture is then relatively rapidly brought to a high temperature in a furnace. For example, the mixture is heated to a temperature in the range of about 1,000° to about 1,400° F. over a period not exceeding 4 hours, preferably not exceeding 2 hours. This relatively rapid heating to calcination temperature generally causes a foaming and expansion of the mixture and then a solidification to a very porous and very uniform mass having a low apparent density. After reaching this calcination temperature, the mass is further heated in air at a temperature in the range of about 1,000° to about 1,400° F. for from about 0.1 to about 24 hours. After this calcination, the catalyst is active for use in oxidative dehydrogenation and, if desired, can be converted to any form or shape such as granules, pellets, powder, and the like.

In another alternative catalyst preparation method, solutions of suitable cobalt and promoting metal compounds are coprecipitated by the addition of alkali metal or alkaline earth metal hydroxides. The precipitate is then filtered, washed, dried, and the resulting solid is then impregnated with a solution of the suitable phosphorus-containing compounds such as phosphoric acid. This composite is then activated by calcination at a temperature in the range of about 900° to about 1,500° F. for from about 0.1 to about 24 hours. Regardless of the specific sequence of steps utilized in the catalyst preparation method, the last stage of the preparation is activation by calcination in an oxygen-containing gas such as air, or air and steam, at a temperature in the range of about 900° to about 1,800° F. for about 0.1 to about 24 hours, or until the catalyst is active for oxidative dehydrogenation.

The dehydrogenatable feedstocks can be converted according to the processes of the present invention under any suitable conditions. In general, these comprise a temperature in the range of from about 800° to about 1,300° F., preferably in the range from about 950° to about 1,200° F., a convenient pressure such as from about 7 to about 250 psia, and a volumetric hydrocarbon:oxygen ratio of about 1:1 to about 1:4. The presence of steam is generally beneficial and volumetric steam:hydrocarbon ratios up to 50:1 can be used. The hydrocarbon feed rate will generally be in the range of from about 50 to about 5,000 GHSV. The fixed catalyst bed is the preferred mode of contact, but other modes such as a fluidized bed can also be used.

The hydrogenation process is ordinarily carried out by forming a mixture preferably a preheated mixture, with the dehydrogenatable feed, the oxygen-containing gas, and the steam (if used), and passing this mixture over the catalyst at the desired temperature. The effluent from the reaction zone is subjected to any suitable separation method, such as fractionation, to isolate and recover the desired products. Unconverted feeds or partially converted materials can be recycled.

The catalysts of the present invention can be utilized for long periods of time without regeneration. However, when regeneration does become necessary, this can be simply accomplished by merely cutting off the flow of dehydrogenatable feedstock and allowing the catalyst to be contacted with the oxygen and steam for a sufficient period of time to restore substantial activity to the catalyst.

Generally, at least trace amounts of oxygenated by-products are also formed in these reactions. For example, compounds such as furan, acetaldehyde, furfural and acetic acid can be obtained. Some carbon oxides will be formed as well as some cracking products.

The invention is illustrated by the following examples.

EXAMPLE I

A number of catalysts were prepared by combining a cobalt compound, a phosphorus compound, and a compound of a metal promoter. In each catalyst preparation, 25 ml of a 1 molar solution of a promoter metal was added to a mixture of 175 ml of a 1 molar solution of $Co(NO_3)_2 \cdot H_2O$ and 3.5 ml of 85 weight percent $H_3PO_4$.

The compounds containing the promoter metals were as follows: $In(NO_3)_3$, $MgSO_4 \cdot 7H_2O$, $Al(NO_3)_3$, $Th(NO_3)_4 \cdot 4H_2O$, $Y(NO_3)_3 \cdot 5H_2O$, $Cd(NO_3)_2 \cdot 4H_2O$, $Pb(NO_3)_2$, $BeSO_4 \cdot 4H_2$), $Zn(NO_3)_2 \cdot 6H_2O$, $MnSO_4 \cdot H_2O$, $AgNO_3$, $Ce(NO_3)_4 \cdot 2NH_4NO_3$, $ZrO(NO_3)_2 \cdot 2H_2O$, $H_3PO_3$, and $Ca(NO_3)_2 \cdot H_2O$. In one instance, for comparison purposes, no promoter metal was added, and the final catalyst consisted only of cobalt, phosphorus and combined oxygen.

Each of the mixtures was heated with stirring. When each was reduced to a sticky syrup, it was transferred to a dish and calcined by heating to 1,200° F. in 2 hours. It was then held at 1,200° F. for an additional 4 hours. During the calcination, the composition foamed and solidified into a low density porous mass. This mass was then cooled and crushed to 20–28 mesh particles. The atomic ratio of the metal-catalyst was 0.5 Me/3.5 Co/1.0 P(equivalent to $Me_{0.14}CoP_{0.29}$). The comparison catalyst had an atomic ratio of 3.5 Co/1.0 P (equivalent to $Me_{0.0}CoP_{0.29}$).

EXAMPLE II

Portions of each of the above-described catalysts were individually charged into a tubular fixed bed reactor and tested for the dehydrogenation of a butane feed and an isopentane feed. At the indicated time of sampling, a sample of the gas-phase portion of the effluent was analyzed by gas-liquid chromatography. From this, the indicated hydrocarbon conversion and selectivity to indicated products was calculated. The selectivity was in terms of modivity percentage, which is a modified selectivity percentage based upon the analysis of vapor phase products including converted hydrocarbons, oxides of carbon, and unconverted feed.

The results of these runs are shown in the following tables.

Oxidative Dehydrogenation Over
3.5 Co/1.0 P/0.5 Promoter Metal Catalyst

Isopentane Feed
1000 Feed GHSV
1080 $O_2$ GHSV
10,000 Steam GHSV
3 hr. on stream
1100° F.

| Promoter Metal | Modivity to $i\text{-}C_5^=$ | Modivity to $i\text{-}C_5^= + i\text{-}C_5^{==}$ | Conversion, % |
|---|---|---|---|
| None | 8.4 | 24 | 31 |
| In | 14 | 14 | 19 |
| Mg | 16 | 16 | 28 |
| Al | 26 | 32 | 23 |
| Th | 18 | 18 | 21 |
| Y | 20 | 22 | 30 |
| Cd | 15 | 15 | 24 |
| Pb | 20 | 51 | 28 |
| Be | 16 | 16 | 31 |
| Zn | 23 | 23 | 20 |
| Mn | 12 | 35 | 28 |
| Ag | 17 | 22 | 24 |
| Ce | 20 | 28 | 30 |
| Zr | 28 | 28 | 23 |
| B | 26 | 32 | 26 |

Butane Feed
500 Feed GHSV
475 $O_2$ GHSV
5000 Steam GHSV
1 hr. on stream
1100° F.

| Promoter Metal | Modivity to $C_4^=$ | Modivity to $C_4^= + C_4^{==}$ | Conversion, % |
|---|---|---|---|
| None | 18 | 53 | 35 |
| In | 19 | 50 | 30 |
| Mg | 22 | 49 | 30 |
| Al | 21 | 47 | 29 |
| Ca | 19 | 52 | 30 |
| Th | 18 | 55 | 30 |
| Cd | 18 | 50 | 29 |
| Zn | 21 | 54 | 32 |
| Mn | 16 | 53 | 34 |
| Ce | 14 | 54 | 30 |
| Zr | 21 | 56 | 34 |

The data in the tables show that the incorporation of a minor amount of a promoting metal into the Co/P/O catalyst composition resulted in at least one of the following improvements in the conversion of isopentane to isoamylenes and isoprene: The conversion was increased, or the modivity (modified selectivity) to both isoamylenes and isoprene was increased, or the modivity to isoprene was increased. The data also illustrate the applicability, activity or advantage of the invention catalysts in the conversion of n-butane to butenes and butadiene.

While certain embodiments of the invention have been described for illustrative purposes, the invention is not limited thereto. Various other modifications or embodiments of the invention will be apparent to those skilled in the art. Such modifications or embodiments are within the spirit and scope of the disclosure.

I claim:

1. A catalyst composition consisting essentially of a calcined mixture of cobalt, phosphorus and a metal promoter, Me, selected from the group consisting of indium, aluminum, yttrium, cadmium, zinc, lead and boron, characterized by the formula
$$Me_xCoP_yO_z$$
wherein $x$ and $y$ are numbers in the range of about 0.01 to about 5, except when Me is aluminum or lead, then $x$ is a number in the range of about 0.1 to 1 and $y$ is a number in the range of about 0.1 to about 0.5, and $z$ is a number determined by the valence requirements of the calcined Me, Co and P mixture.

2. The composition of claim 1 wherein Me is indium.
3. The composition of claim 1 wherein Me is aluminum.
4. The composition of claim 1 wherein Me is yttrium.
5. The composition of claim 1 wherein Me is cadmium.
6. The composition of claim 1 wherein Me is zinc.
7. The composition of claim 1 wherein Me is lead.
8. The composition of claim 1 wherein Me is boron.

* * * * *